April 2, 1963  C. HIEKEN  3,084,341
DATA SIGNAL COMBINING SYSTEM
Filed July 30, 1958  2 Sheets-Sheet 1

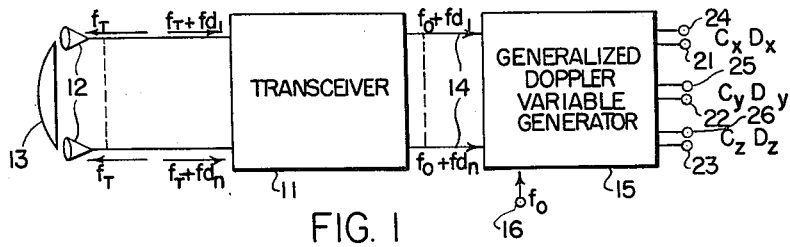

FIG. 1

| | FOUR BEAMS | THREE BEAMS SPACED 120° | THREE BEAMS SPACED 90° |
|---|---|---|---|
| $D_x =$ | $\dfrac{K(fd_1 - fd_2)}{2 \cos \theta}$ | $\dfrac{K(2fd_1 - fd_2 - fd_3)}{3 \cos \theta}$ | $\dfrac{K(fd_2 - fd_3)}{2 \cos \theta}$ |
| $D_y =$ | $\dfrac{K(fd_3 - fd_4)}{2 \cos \theta}$ | $\dfrac{K(fd_2 - fd_3)}{3 \cos \theta}$ | $\dfrac{K(2fd_1 - fd_2 - fd_3)}{2 \cos \theta}$ |
| $D_z =$ | $\dfrac{-K(fd_1 + fd_2)}{2 \cos \theta}$ | $\dfrac{K(fd_1 + fd_2 + fd_3)}{3 \sin \theta}$ | $\dfrac{-K(fd_2 + fd_3)}{2 \sin \theta}$ |

SYMBOLS $\left.\begin{array}{l}fd_1\\fd_2\\fd_3\\fd_4\end{array}\right\}$ DOPPLER FREQ. SHIFTS ASSOCIATED WITH THE RESPECTIVE BEAMS

FIG. 2

$\left.\begin{array}{l}D_x\\D_y\\D_z\end{array}\right\}$ GENERALIZED DOPPLER VARIABLES FOR THE THREE TRANSLATIONAL MOTIONS

K - PROPORTIONALITY CONSTANT

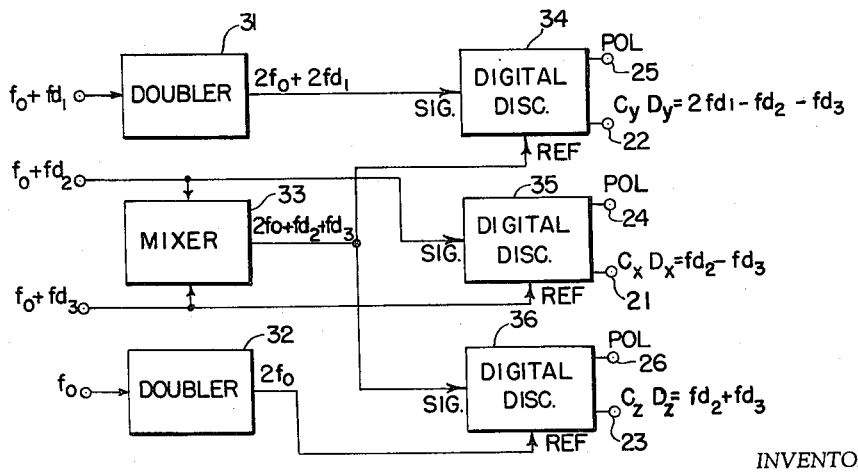

FIG. 3

INVENTOR.
CHARLES HIEKEN
BY Fred Jacob
ATTORNEY

April 2, 1963  C. HIEKEN  3,084,341
DATA SIGNAL COMBINING SYSTEM
Filed July 30, 1958  2 Sheets-Sheet 2
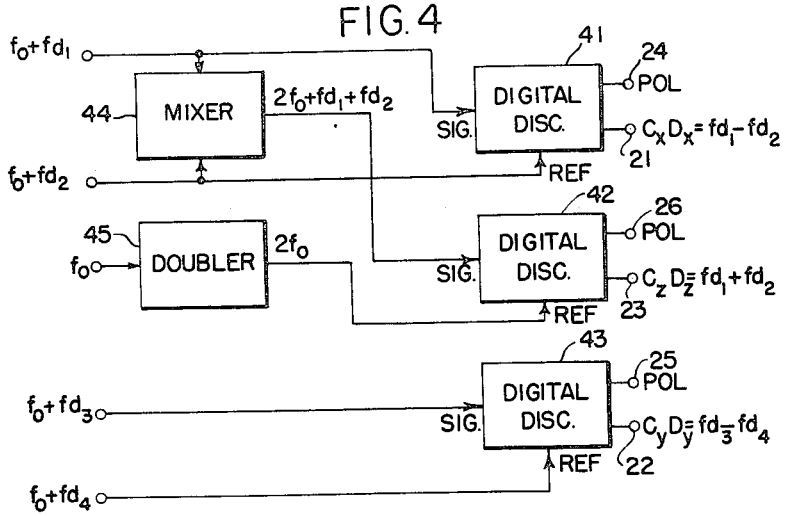
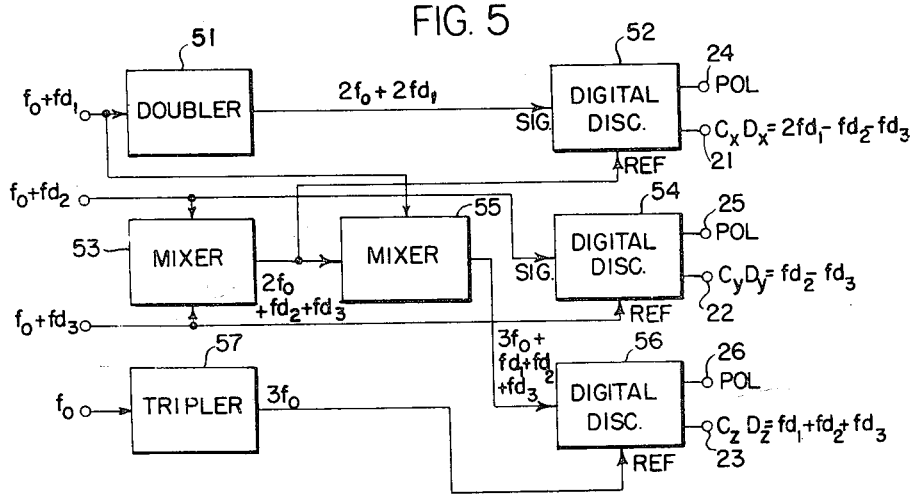
INVENTOR.
CHARLES HIEKEN
BY
Fred Jacob
ATTORNEY

– – – – – – – – – – – – – – – – – – – – – – – – – – –

3,084,341
DATA SIGNAL COMBINING SYSTEM
Charles Hieken, Newton Upper Falls, Mass., assignor to Laboratory for Electronics, Inc., Boston, Mass., a corporation of Delaware
Filed July 30, 1958, Ser. No. 752,100
9 Claims. (Cl. 343—8)

The present invention relates in general to data signal combining systems and in particular to improved apparatus for combining signals including a Doppler frequency shift to provide output signals having rates proportional to orthogonal velocity components. The utility of the present invention in a Doppler radar navigational system is disclosed in the co-pending application of Maurice A. Meyer, entitled Signal Processing Apparatus, Serial No. 615,733, filed October 10, 1956, and assigned to the assignee of this application. In association with the airborne Doppler radar system disclosed in that application and the copending application of Maurice A. Meyer entitled Doppler Radar System, Serial No. 610,444, filed September 10, 1956, three output signals are provided in pulse form, each having a frequency or rate directly proportional to respective velocity components of the aircraft along three orthogonal axes, one of which is the normally vertical axis of the aircraft. The overall system is sufficiently sensitive to slight velocity changes to be utilized as a hovering indicator in a helicopter, yet is still capable of responding to the relatively high Doppler frequency shifts associated with the supersonic velocities of jet aircraft and rocket powered missiles.

Fundamentally, Doppler navigational systems are based on the physical principle that the relative movement between a source of cyclical energy waves and a receiver produces an apparent change of frequency in the wave received by the latter. Where the source and the receiver are at the same point in relative motion to a reflecting object and the energy is electromagnetic, the measured Doppler shift of the received wave is $$f_\mathrm{d} = \frac{2f_0}{c} V \cos \phi$$

where $f_0$ is the transmitted frequency, $c$ is the velocity of light, $V$ is the relative velocity between source and reflecting object, and $\phi$ is the angle between the velocity vector and the direction of propagation of the radiated energy.

The application of this principle for the determination of vehicle velocities relative to a fixed point is well known and widely used. For example, along the highways the principle is employed for the determination of automobile speeds. Doppler navigational systems for large piston engined fixed wing aircraft are also known; however, the requirements are not as stringent as those which a helicopter or jet aircraft navigating system must satisfy. Considerations of the characteristics of the various types of aircraft readily explains this difference. A fixed wing piston engined aircraft continuously moves forward at a medium, nearly constant velocity, while a helicopter may move forward, backward, sideways or hover at zero velocity, and jet aircraft frequently travel at supersonic speeds. Even when moving forward, the speed of a helicopter is appreciably smaller than that of the usual fixed wing aircraft. Since the Doppler frequency shift, $f_\mathrm{d}$, is proportional to the magnitude of velocity, it follows that for a given source frequency, a smaller deviation will be observed from a system aboard a helicopter than from a system transported by a fixed wing aircraft with piston engines. Thus, not only must the helicopter Doppler system retain the sense of the Doppler shift in order to determine whether the helicopter is moving backward or forward, left or right, but also accurately sense a relatively small change in frequency. Yet, the relatively small payload of a helicopter dictates a requirement that the apparatus be compact and lightweight. The latter requirement is also present in jet fighter aircraft navigational systems and, as a matter of fact, always desirable. Furthermore, such systems for use aboard high speed aircraft must be capable of responding to the resulting relatively high Doppler frequency shifts.

Basically, a single beam airborne Doppler system includes a microwave radar transmitter which radiates a beam of microwave energy along the direction of the aircraft flight path oriented at a fixed angle relative to the vertical axis of the aircraft and means for receiving the reflected beam energy and determining the change in frequency. The Doppler frequency shift is proportional to the projection of the aircraft velocity vector onto the direction of electromagnetic radiation. Conversely, a measure of this velocity is the ratio of the measured Doppler frequency shift to the transmitted frequency divided by the cosine of the angle between the velocity vector and the beam. Since the actual track of the aircraft does not normally coincide with its heading because of wind velocity components orthogonal to the desired track, it is desirable to have another beam oriented so that the reflected signal is indicative of the aircraft velocity orthogonal to its heading. Then, by combining these two components of velocity with reference to the aircraft heading as indicated by a gyro compass or other suitable instrument, and referring to the aircraft's starting point, the aircraft position may be computed. By adding a third beam, the vertical component of velocity may be determined.

In a typical system, a number of pencil beams of microwave energy are radiated in different directions in the azimuth plane, each beam being depressed downward to form an angle $\theta$ between the beam axis and the horizontal plane of the aircraft in its normal flight attitude.

Energy from each radiated beam returned from the earth is separately received. By combining the Doppler frequency shift information from the three beams, the known orientation of the beams relative to the aircraft, and the roll and pitch of the aircraft, velocity components along its three orthogonal axes may be determined.

Prior techniques employed a suitable combination of mixers and doublers to provide three signals having spectral components including appropriate algebraic combinations of the transposed received signals, the frequency of each such component being spaced from a fixed radio frequency by an appropriate algebraic combination of Doppler frequency shifts. These three signals are applied to respective signal inputs of a digital discriminator of the type disclosed in the co-pending application of Bernard M. Gordon entitled Digital Discriminator, Serial No. 319,571, filed November 8, 1952, now Patent No. 2,858,425, and assigned to the assignee of this application. A signal of the fixed radio frequency is applied to the reference input of each digital discriminator. The digital discriminator signal output line then provides an output pulse train wherein the pulse rate is equal to the difference between the frequency of the signal on the signal input and the fixed reference frequency signal applied to the reference input, or equal to the algebraic combination of the Doppler frequency shifts present in the signal applied to the signal input. The signal on the polarity output line from the digital discriminator indicates whether the frequency on the signal input is higher or lower than that on the reference input.

The present invention contemplates and has as a primary object the provision of the desired output signals with a system employing less apparatus and fewer fixed frequency signals. Basically, this is accomplished by energizing the reference input of at least one digital discriminator with a signal including a Doppler frequency shift so that algebraic combination and conversion to output pulse rates directly proportional to orthogonal velocity components is combined in the digital discriminators.

Other features, objects and advantages of the invention will become apparent from the following specification when read in connection with the accompanying drawing in which:

FIG. 1 is a block diagram showing the logical arrangement of a Doppler radar system utilizing the novel apparatus;

FIG. 2 is a table of the equations which relate the Doppler frequency shifts present in energy returned from the respective radiated beams for various different beam orientations in the azimuth plane to the generalized Doppler variables for the three translational motions;

FIG. 3 is a block diagram of a preferred embodiment of the invention wherein the Doppler frequency shifts due to three radiated beams orthogonally oriented in the azimuth plane are appropriately combined;

FIG. 4 is a block diagram of another embodiment of the invention in which the frequency shifts due to four radiated beams orthogonally oriented in the azimuth plane are appropriately combined; and FIG. 5 is a block diagram of another embodiment of the invention in which the Doppler frequency shifts received in response to three radiated beams equiangularly oriented in the azimuth plane are combined.

With reference now to the drawing, and more particularly FIG. 1 thereof, there is illustrated a block diagram generally illustrating the logical arrangement of a Doppler radar system adapted to be carried aboard an aircraft and including the novel system for generating the generalized Doppler variable signals characteristic of the aircraft velocity along orthogonal axes, including the vertical axis of the aircraft in its normal attitude. A microwave transceiver 11 provides microwave energy of frequency $f_t$ to a plurality of horns 12 for radiation through a microwave lens 13. Lens 13 focuses the energy into highly collimated pencil beams depressed downward from the bottom of the aircraft and oriented in different directions in the azimuth plane. Energy returned from the respective radiated beams to the lens 13 is focused thereby upon that one of horns 12 from which it emanated, but having its frequency shifted by an amount $f_{dn}$. The energy from each beam is separately processed by transceiver 11 and respective signals are provided an output lines 14 having a frequency displaced from a predetermined fixed frequency, $f_0$, by the respective Doppler shifts $f_{d1} \ldots f_{dn}$.

The respective signals on lines 14 are appropriately combined in generalized Doppler variable generator 15 with a fixed frequency signal of frequency $f_0$ applied on terminal 16 to provide three output pulse trains on terminals 21, 22 and 23, designated $C_xD_x$, $C_yD_y$ and $C_zD_z$, respectively, each being proportional to the aircraft velocity along one of orthogonal axes. The polarity of the signals on the polarity output terminals 24, 25 and 26 indicates the sense of the velocities designated by the pulse rates on terminals 21, 22 and 23, respectively.

With reference to FIG. 2, there is shown a table of the generalized Doppler variables $D_x$, $D_y$ and $D_z$ as a function of the Doppler frequency shift in energy returned from respective beams for the different configurations indicated at the top of each column, the beams being depressed at an angle $\theta$ from the horizontal when the aircraft assumes its normal attitude. Since the derivation of these relations is fully discussed in the aforesaid co-pending application of Maurice A. Meyer entitled Doppler Radar System, the discussion which follows will concern only the novel apparatus for combining signals including respective Doppler frequency shifts from the different beams to provide the generalized Doppler variable signals.

With reference to FIG. 3, there is shown a block diagram of a preferred embodiment of the invention for combining signals including the Doppler frequency shifts derived from three radiated pencil beams directed in three different orthogonal directions in the azimuth plane. The apparatus comprises a pair of frequency doublers 31 and 32, a mixer 33 and three digital discriminators 34, 35 and 36. These digital discriminators are preferably of the type disclosed in the co-pending application of Bernard M. Gordon entitled Digital Discriminator discussed above. Such a discriminator responds to a pair of signals respectively applied to reference and signal inputs by providing an output pulse train having a rate equal to the frequency difference between said pair of signals and a polarity output signal to indicate which of the signals is of higher frequency. Other apparatus which provides such signals, in pulse form or otherwise, may be substituted therefor.

The returned energy from each radiated beam is separately processed in a receiving channel. It is advantageous if the three channels are identical since design and interchangeability of units is thereby facilitated. This may be accomplished when the combining system of the present invention is used. Therefore, the output signal from each receiving channel is a signal having a frequency displaced from the same fixed predetermined radio frequency, designated $f_0$, by the Doppler frequency shift present in the returned energy.

The signal of frequency $f_0+f_{d1}$ is applied to frequency doubler 31 to provide a signal of frequency $2f_0+2f_{d1}$. The signals of frequency $f_0+f_{d2}$ and $f_0+f_{d3}$ are applied to mixer 33 to provide an output signal of sum frequency $2f_0+f_{d2}+f_{d3}$. The latter sum frequency signal is applied to the reference input of digital discriminator 34 while the signal input thereof is energized by the signal from doubler 31 of frequency $2f_0+2f_{d1}$. The reason for doubling and mixing, as indicated above, now becomes apparent, for the output signal on output terminal 22 of digital discriminator 34 is a pluse train having a rate $2f_{d1}-f_{d2}-f_{d3}$ and is proportional to the desired generalized Doppler variable $D_y$. The sense of this algebraic combination of frequencies is indicated by the polarity output signal on terminal 25.

The sum frequency output signal from mixer 33 is also applied to the signal input of digital discriminator 36. The reference input thereto is energized with a fixed frequency signal of frequency $2f_0$ derived by doubling the frequency of a signal of fixed frequency $f_0$ applied to doubler 32. Thus, the output signal on terminal 23 of digital discriminator 36 is a pulse train having a rate equal to $f_{d2}+f_{d3}$ and proportional to the desired generalized Doppler variable $D_z$, the associated polarity output signal on terminal 26 indicating the sense of this sum frequency.

The third generalized Doppler variable signal is derived by energizing digital discriminator 35 with the signals of frequency $f_0+f_{d2}$ and $f_0+f_{d3}$ on the signal and reference inputs, respectively. Digital discriminator 35 then provides an output pulse train upon terminal 21 having a rate equal to the frequency difference $f_{d2}-f_{d3}$, proportional to the generalized Doppler variable $D_x$ and a polarity output signal on terminal 24 indicative of the sense of the latter difference frequency.

Referring to FIG. 4, there is illustrated a block diagram of an embodiment of the invention which combines signals including the Doppler frequency shifts from energy returned in response to the radiation of four pencil beams directed in four orthogonal directions in the azimuth plane. A digital discriminator 41 is energized by a signal of frequency $f_0+f_{d1}$ on its signal input and a signal of frequency $f_0+f_{d2}$ on its reference input to provide on output terminal 21 a pulse train having a rate equal to the difference frequency $f_{d1}-f_{d2}$ and proportional to the generalized Doppler variable $D_x$. The sense of this frequency difference is indicated by the signal on polarity output terminal 24.

Mixer 44 is energized by the same signals applied to digital discriminator 41 to provide a signal of sum frequency, $2f_0+f_{d1}+f_{d2}$. This sum signal is applied to the signal input of a digital discriminator 42. The reference input of digital discriminator 42 is energized by a signal of fixed frequency, $2f_0$, derived by doubling the signal of fixed radio frequency $f_0$ applied to the input of a doubler 45. An output pulse train having a rate equal to the sum frequency $f_{d1}+f_{d2}$ is provided on terminal 23 proportional to the generalized Doppler variable $D_z$. The sense of this sum frequency is indicated by the signal on polarity output terminal 26.

Signals of frequency $f_0+f_{d3}$ and $f_0+f_{d4}$ are applied to the signal and reference inputs, respectively, of a digital discriminator 43 to provide an output pulse train having a rate equal to the difference frequency $f_{d3}-f_{d4}$ on terminal 22. The sense of this difference frequency is indicated by the signal on polarity output terminal 25.

Referring to FIG. 5, there is shown a block diagram of another embodiment of the invention for combining signals including the Doppler frequency shift in energy returned from respective ones of three radiated pencil beams equiangularly oriented in the azimuth plane. A signal of frequency $f_0+f_{d1}$ is applied to doubler 51 which provides an output signal of frequency $2f_0+2f_{d1}$ for application to the signal input of digital discriminator 52. Signals of frequency $f_0+f_{d2}$ and $f_0+f_{d3}$ are combined in mixer 53 to provide an output signal of sum frequency $2f_0+f_{d2}+f_{d3}$ for application to the reference input of digital discriminator 52. Digital discriminator 52 then provides an output pulse train on terminal 21 having a rate $2f_{d1}-f_{d2}-f_{d3}$, proportional to the generalized Doppler variable $D_x$. The sense of this algebraic combination of frequencies is indicated by the signal on polarity output terminal 24.

The signals of frequency $f_0+f_{d2}$ and $f_0+f_{d3}$ are applied to the signal and reference inputs, respectively, of a digital discriminator 54 to provide an output pulse train on output terminal 22 having a rate equal to the difference frequency $f_{d2}-f_{d3}$ and proportional to the generalized Doppler variable $D_y$. The sense of this frequency difference is indicated by the signal on polarity output terminal 25.

The output sum signal from mixer 53 and the signal of frequency $f_0+f_{d1}$ are combined in a mixer 55 which provides an output signal of sum frequency, $$3f_0+f_{d1}+f_{d2}+f_{d3}$$

which is applied to the signal input of a digital discriminator 56. The reference input of digital discriminator 56 is energized by a signal of fixed frequency $3f_0$ which is derived by tripling a signal of fixed frequency $f_0$ applied to the input of a frequency tripler 57. The output signal on terminal 23 is then a pulse train having a rate equal to the sum frequency $f_{d1}+f_{d2}+f_{d3}$. The sense of this sum frequency is indicated by the signal on the polarity output terminal 26.

The exemplary embodiments of signal combining apparatus described above illustrate means for accurately deriving signals proportional to the desired generalized Doppler variables with a minimum of apparatus. Moreover, the novel system combines Doppler frequency shifts centered about the same predetermined fixed radio frequency. Furthermore, regardless of the beam configuration, the signals derived from energy returned from each beam need only by combined with a single fixed frequency signal to derive all the generalized Doppler variable signals. An embodiment of the invention of the type disclosed in FIG. 3 in which the frequency $f_0$ is 500 kc. has been used in a Doppler radar navigational system to provide accurate navigational information over a long distance with exceptional accuracy.

It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. Apparatus for providing an output signal including a rate signal indicative of the algebraic combination of the rate of a first signal varying in accordance with a first variable quantity and the rate of a second signal varying in accordance with a second variable quantity together with an indication of which of the said first and second signal rates is higher comprising, a digital discriminator having a reference input, a signal input, a signal output line and a polarity output line, said discriminator providing a signal on said signal output line having a rate equal to the difference between first and second high frequency signal rates on said reference and signal inputs, both of said high frequency signal rates being near an integral multiple of a predetermined radio frequency, said discriminator also providing a sense indication on said polarity output line characteristic of which of said first and second high frequency signal rates is the higher, a source of said first and second signals, means for transposing the frequency of said first and second signals to respective positions in the frequency spectrum displaced from said predetermined radio frequency by said first and second signal rates respectively, and means for coupling said transposed first and second signals to said signal input and said reference input respectively.

2. In a Doppler radar system, apparatus for providing an output signal including a rate signal indicative of the velocity of a vehicle carrying said system along a predetermined axis of said vehicle when its normally vertical axis is oriented in a prescribed relationship with respect to a fixed geographical vertical axis, comprising, a source of a plurality of signals each having a Doppler frequency shift related to the velocity of said vehicle along a respective beam of high frequency energy radiated thereby, a digital discriminator having a reference input, a signal input, a signal output line and a polarity output line, said discriminator providing a signal on said signal output line having a rate equal to the difference between first and second high frequency signal rates on said reference and signal inputs, both of said high frequency signal rates being near a predetermined radio frequency, said discriminator also providing a sense indication on said polarity output line characteristic of which of said first and second high frequency signal rates is the higher, means for combining said plurality of signals to derive first and second radio frequency signals each having a frequency which differs from said predetermined radio frequency by related ones of said Doppler frequency shifts, and means for coupling said first and second radio frequency signals to said reference and signal inputs respectively to provide output signals on said signal and polarity output lines having a rate and polarity characteristic of said velocity and its sense respectively.

3. Apparatus in accordance with claim 2 and further comprising, a source of at least one fixed frequency signal, and means for combining said fixed frequency signal with at least one of said plurality of signals to derive at least one of said first and second radio frequency signals.

4. Apparatus in accordance with claim 3 wherein said source of a fixed frequency signal comprises, a source of a signal having a frequency equal to said predetermined radio frequency signal, and means for doubling the frequency of the said signal having said pretermined frequency to provide said fixed frequency signal.

5. Apparatus in accordance with claim 3 and further comprising, a plurality of said digital discriminators, each of said digital discriminators providing output signals on its signal and polarity output lines having a rate and polarity characteristic of said velocity and its sense respectively along a respective one of orthogonally oriented axes of said vehicle.

6. Apparatus in accordance with claim 5 wherein said combining means comprises at least a frequency mixer and a frequency multiplier.

7. In a Doppler radar system, apparatus for providing three output signals characteristic of the magnitude and sense of respective velocity components of a vehicle carrying said system along three orthogonal axes thereof, comprising a source of first, second and third signals having Doppler frequency shifts $f_{d1}$, $f_{d2}$ and $f_{d3}$ respectively, said frequency shifts being related to the velocity of said vehicle along respective beams of high frequency energy radiated thereby, first, second and third digital discriminators each having a reference input, a signal input, a signal output line and a polarity output line, each of said discriminators providing a signal on said signal output line having a rate equal to the difference between first and second high frequency signal rates on said reference and signal inputs, both of said high frequency signal rates being near an integral multiple of a predetermined radio frequency, each of said discriminators also providing a sense indication of which of said first and second high frequency signal rates is the higher, a source of a signal of said predetermined radio frequency, means for transposing the frequency of said first, second and third signals to respective positions in the frequency spectrum displaced from said predetermined radio frequency by their respective Doppler frequency shifts, means for doubling the frequency of said transposed first signal, means for mixing said transposed second signal with said transposed third signal to derive a sum signal having a frequency equal to the sum of the frequencies of said second and third transposed signals, means for coupling said sum signal to said first digital discriminator reference input and to said third digital discriminator signal input, means for coupling said doubled transposed first signal to said first digital discriminator signal input, a source of a fixed frequency signal of said predetermined frequency, means for doubling the frequency of said fixed frequency signal, means for coupling said doubled fixed frequency signal to said third digital discriminator reference input, and means for coupling said second transposed and said third transposed signals to second digital discriminator signal and reference inputs respectively, the signal output rates of said first, second and third digital discriminators being $2f_{d1}-f_{d2}-f_{d3}$, $f_{d2}-f_{d3}$ and $f_{d2}+f_{d3}$ respectively.

8. In a Doppler radar system, apparatus for providing three output signals characteristic of the magnitude and sense of respective velocity components of a vehicle carrying said system along three orthogonal axes thereof, comprising a source of first, second and third signals having Doppler frequency shifts $f_{d1}$, $f_{d2}$ and $f_{d3}$ respectively, said frequency shifts being related to the velocity of said vehicle along respective beams of high frequency energy radiated thereby, first, second and third digital discriminators each having a reference input, a signal input, a signal output line and a polarity output line, each of said discriminators providing a signal on said signal output line having a rate equal to the difference between first and second high frequency signal rates on said reference and signal inputs, both of said high frequency signal rates being near an integral multiple of a predetermined radio frequency, each of said discriminators also providing a sense indication of which of said first and second high frequency signal rates is the higher, a source of a signal of said predetermined radio frequency, means for transposing the frequency of said first, second and third signals to respective positions in the frequency spectrum displaced from said predetermined radio frequency by their respective Doppler frequency shifts, means for doubling the frequency of said transposed first signal, means for coupling said doubled transposed first signal to said first digital discriminator signal input, means for mixing said transposed second signal and said transposed third signal to derive a first sum signal having a frequency equal to the sum of the frequencies of said transposed second and third signals, means for mixing said first sum signal and said transposed first signal to derive a second sum signal having a frequency equal to the sum of the frequencies of said first sum and said transposed first signals, means for coupling said transposed second signal and said transposed third signal to said second digital discriminator signal and reference inputs respectively, a source of a signal of said predetermined radio frequency, means for tripling the frequency of said signal of said predetermined radio frequency, means for coupling said second sum signal to said third digital discriminator signal input, and means for coupling said tripled signal to said third digital discriminator reference input, the signal output rates of said first, second and third digital discriminators being $2f_{d1}-f_{d2}-f_{d3}$, $f_{d2}-f_{d3}$ and $f_{d2}+f_{d3}$ respectively.

9. In a Doppler radar system, apparatus for providing three output signals characteristic of the magnitude and sense of respective velocity components of a vehicle carrying said system along three orthogonal axes thereof, comprising a source of first, second, third and fourth signals having Doppler frequency shifts $f_{d1}$, $f_{d2}$, $f_{d3}$ and $f_{d4}$ respectively, said frequency shifts being related to the velocity of said vehicle along respective beams of high frequency energy radiated thereby, first, second and third digital discriminators each having a reference input, a signal input, a signal output line and a polarity output line, each of said discriminators providing a signal on said signal output line having a rate equal to the difference between first and second high frequency signal rates on said reference and signal inputs, both of said high frequency signal rates being near an integral multiple of a predetermined radio frequency, each of said discriminators also providing a sense indication of which of said first and second high frequency signal rates is the higher, a source of a signal of said predetermined radio frequency, means for transposing the frequency of said first, second, third and fourth signals to respective positions in the frequency spectrum displaced from said predetermined radio frequency by their respective Doppler frequency shifts, means for coupling said transposed first signal and said transposed second signal to said first digital discriminator signal and reference inputs respectively, means for mixing said transposed first signal with said transposed second signal to derive a sum signal having a frequency equal to the sum of the frequencies of said first and second transposed signals, means for coupling said sum signal to said second digital discriminator signal input, a frequency doubler, means for doubling the frequency of said predetermined radio frequency signal, means for coupling said doubled radio frequency signal to said second digital discriminator reference input, and means for coupling said transposed third signal and said transposed fourth signal to said third digital discriminator signal and reference inputs respectively, the signal output rates of said first, second and third digital discriminators being $f_{d1}-f_{d2}$, $f_{1d}+f_{2d}$ and $f_{3d}-f_{d4}$ respectively.

References Cited in the file of this patent
UNITED STATES PATENTS

| | | |
|---|---|---|
| 2,858,425 | Gordon | Oct. 28, 1958 |
| 2,869,117 | Berger | Jan. 13, 1959 |